US006989646B2

(12) United States Patent
Jackson et al.

(10) Patent No.: US 6,989,646 B2
(45) Date of Patent: Jan. 24, 2006

(54) MULTI-AXIS AIR/ELECTRICAL CONTROL SYSTEM

(76) Inventors: Stuart Pollard Jackson, 3732 Laurel Ridge Rd., Roanoke, VA (US) 24017; Marlin Harold Thompson, 4525 Naff Rd., Boones Mill, VA (US) 24065; Earl Christian Close, 2288 the Collegeway Unit #9, Mississauga, Ontario (CA) L5L3Z5; Larry Patrick Munger, 3807 Pralin Pl., Roanoke, VA (US) 24012; Jeffrey William Fenner, 526 Shamrock La., Boones Mill, VA (US) 24065; Ted Anthony Reed, 8295 Ram Dr., Roanoke, VA (US) 24019

( * ) Notice: Subject to any disclaimer, the term of this patent is extended or adjusted under 35 U.S.C. 154(b) by 18 days.

(21) Appl. No.: 10/422,743

(22) Filed: Apr. 24, 2003

(65) Prior Publication Data

US 2004/0012365 A1 Jan. 22, 2004

Related U.S. Application Data

(60) Provisional application No. 60/375,992, filed on Apr. 29, 2002.

(51) Int. Cl.
*G05D 16/00* (2006.01)

(52) U.S. Cl. .................. 318/645; 318/568.1; 318/610; 417/16; 74/89.25; 700/245

(58) Field of Classification Search ............ 318/568.1, 318/8, 52, 675, 628; 388/814; 901/11–22; 417/16, 44.1; 60/431; 74/89.25, 89.15
See application file for complete search history.

(56) References Cited

U.S. PATENT DOCUMENTS

| | | | | | |
|---|---|---|---|---|---|
| 4,543,638 | A | * | 9/1985 | Scarffe | 700/245 |
| 5,656,903 | A | * | 8/1997 | Shui et al. | 318/568.1 |
| 6,126,401 | A | * | 10/2000 | Latham | 417/16 |
| 6,240,246 | B1 | * | 5/2001 | Evans | 388/814 |
| 6,370,975 | B1 | * | 4/2002 | Nagai et al. | 74/89.25 |

* cited by examiner

*Primary Examiner*—Paul Ip
(74) *Attorney, Agent, or Firm*—James W. Hiney

(57) ABSTRACT

A system for allowing a wide selection of components to affect a desired result in the positioning business. Up to nine axes of coordinated motion are offered each of which may use a servomotor, a single or double rod air cylinder. The control for the system is a series of digital commands that cause the cylinder to accelerate, decelerate, maintain a given velocity, stop or pause and repeat a series of commands. It uses a low power servo system which, when activated, opens an air valve to an air cylinder which then moves until the valve actuator is turned off by the cylinder thus causing the air cylinder to follow the lower power servo system.

14 Claims, 12 Drawing Sheets

ILLUSTRATION # 1

PNEUMATIC POSITION SYSTEM # 3

MULTI-AXIS AIR/ELECTRICAL CONTROL SYSTEM

The disclosure relies on Provisional Patent application Ser. No. 60/375,992, filed Apr. 29, 2002 with the same six inventors at the instant application.

This invention relates to a novel, highly accurate and positive control system for increased flexibility and wide capability for such apparatus as used in assembly plant automation at minimum cost. The system employs air cylinder positioning controls which eliminate the need for costly servo motors. It can be adjusted by hand, mechanically, electrically or by computer control.

THE PROBLEM

Heretofore, in apparatus demanding quick, positive movements of components, such as assembly arms carrying drills, drivers, punches, etc., there has been a need for expensive servo motors to implement the function of the apparatus and to insure accurate movement in a quick decisive manner. While these systems have served industry with fair reliability, they are very expensive and are not immune to inaccurate movement of the apparatus they control, for example, allowing "backplay" by overcompensating moving the component from one position to another.

BRIEF DESCRIPTION OF THE INVENTION

The instant invention solves all the problems heretofore encountered by using servo motors. It is a multi-axis, up to nine, servo system using solid state digital control by driving a DC electrical motor, with or without brushes, or an air cylinder which may or may not have a control rod, or both, to offer multiaxis coordinated positioning, velocity, torque/force system or cable and also provides the opportunity to choose the lowest cost power amplifier for each axis

BACKGROUND ART

None of the prior attempts to solve the problem confronted by the instant invention. U.S. Pat. No. 6,249,985 disclosure serves to position the workpiece by mechanical movement for temporary positioning with multidimensional support. U.S. Pat. No. 4,195,413 is an apparatus for the position of a part along two orthogonal directions thereby providing for loading the position of the carriage. U.S. Pat. No. 4,593,460 shows a device for providing electro-pneumatic controlled clamping bars at opposite ends of an X-Y plotting table allowing the operator to clamp or release the work piece. U.S. Pat. No. 4,884,889 shows a calibration system for a coordinate measuring device. U.S. Pat. No. 4,932,131, shows a machine capable of determining the probe position. The description in U.S. Pat. No. 5,154,002 relates to a means for using a position detecting probe to determine three dimensions as it moves in three nonaligned directions.

In U.S. Pat. No. 5,621,978 there is shown a coordinate measuring machine using three coordinate arms to measure position. The disclosure of U.S. Pat. No. 5,726,917 covers a method of controlling measuring apparatus. The position of the apparatus is predetermined by the computer as a point sequence such as provided by a CAC system. U.S. Pat. No. 5,778,548 is a noncontact viewing device providing a means of determining three-dimensional measurements. U.S. Pat. No. 5,966,681 is directed to maintaining an accurate force and angle in order to more rapidly and accurately determine the resultant force. The last U.S. Pat. No. 6,134,506 discloses a means for tracking and measuring three dimensional coordinates of a three dimensional object.

The instant invention differs from the aforementioned patents in that it does not include the item positioned, it can be used to position measuring devices, the components are off the shelf items, it includes a digital input, it can handle large weights, small servomotors can handle the most delicate parts and up to nine axes may be coordinated.

OBJECTS OF THE INVENTION

An object of this invention is to provide a multi-axis system capable servo system for positive, accurate positioning of components attached thereto.

Another object of this invention is to provide a multi-axis using air motors for positioning components.

Yet another object of this invention is to provide a unique multi-axis control positioning system with an air cylinder positioning arrangement that can be operated by hand, mechanically, electrically or by computer.

Still another object of this invention is to provide a feedback gain system for manipulating a multi-axis control system.

It is another object of this invention to provide an innovative valve control for a multi-axis servo system for accurate positioning of components.

These and other objects will become apparent when reference is made to the accompanying drawings.

DETAILED DESCRIPTION

Figure 1:
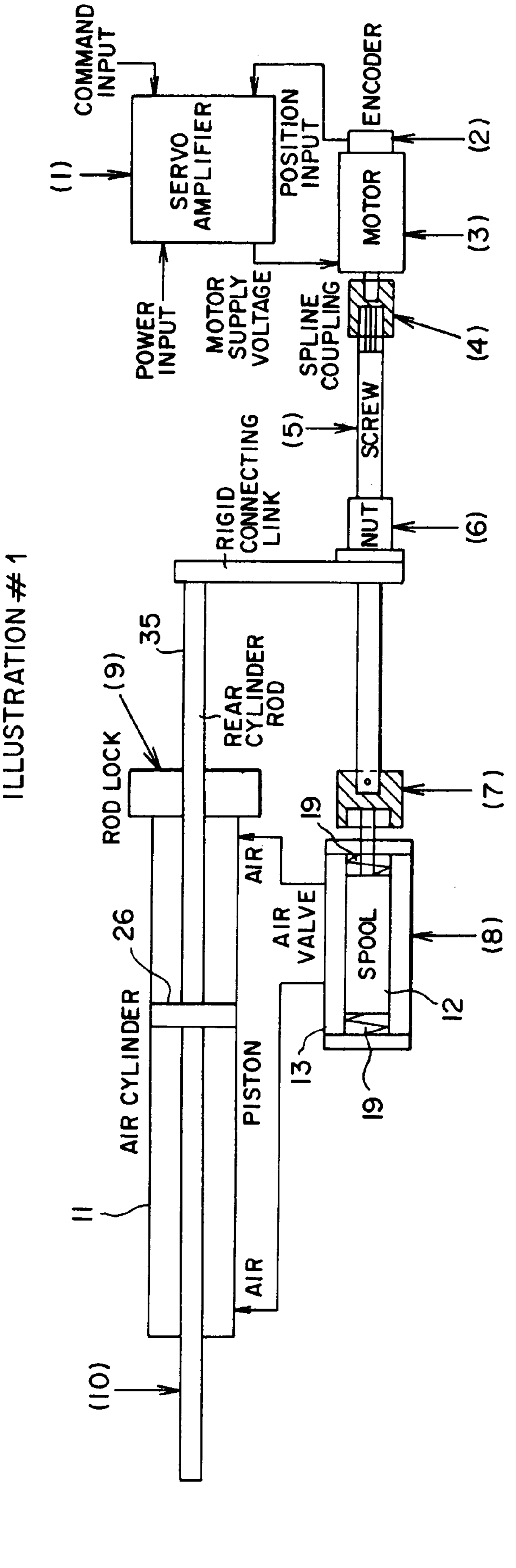
FIG. 1 is a diagrammatic view of the system using a rod lock capability.
Figure 2:
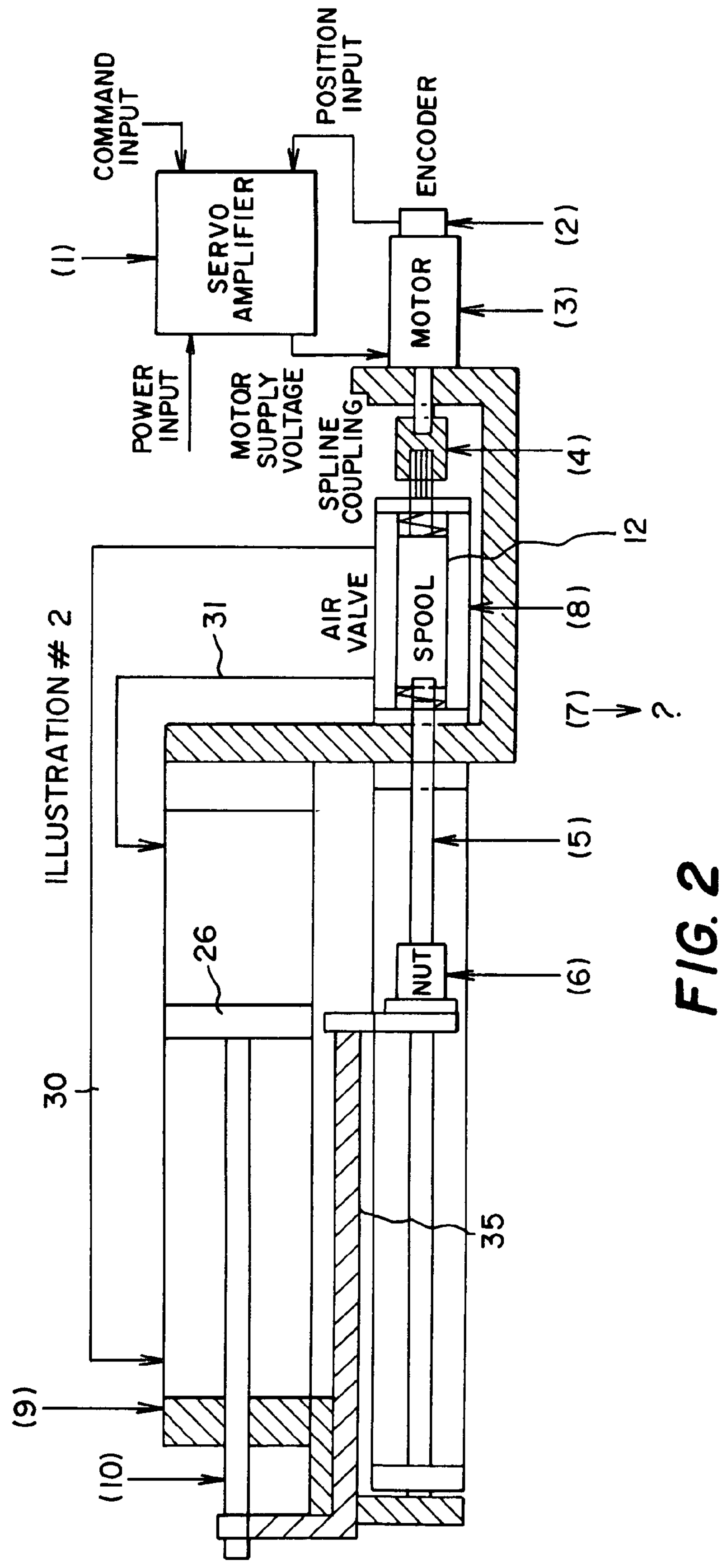
FIG. 2 is a diagrammatic view of the system without a rod lock capability with only a spool and control.

Referring now to FIG. 1 there is shown a diagrammatic view of the system. The difference between FIGS. 1 and 2 are in the type of air valve used and the type of air cylinder employed. The difference in the air valves is in the type of sealing material used. The servo amplifier is shown in 1 and consists of the amplifier into which the commands, the power and positioning feedback are inputted. The amplifier has several boards each designated to work with an air cylinder such as 11. The cylinder has a rod 10 therein which is designed to move forward and backward in conjunction with rod lock 9. The amplifier will accommodate up to nine axes of motion using any combination of air cylinders and motors. The position feedback input can employ encoders or Hall pickups moving over a linear magnetic scale. There are five inputs totally available, two for cylinder limits, two for general purposes and one for home. Isolated outputs (four) are available to clamp or release a rod lock solenoid. The unique arrangements of software commands allow for simple customization of the feedback loop to accommodate position, velocity and torque needs. Operator commands are stored in memory and sequentially directed to the motors. An array of commands can be inserted together with "wait" periods, repeat sequences, stop or go as directed with appropriate acceleration, velocity, distance and deceleration.

The encoder 2 is primarily a position reader of choice. The motor 3 follows the command of the system operator. A spline coupling of 4 connects the motor to a screw 5 which may be of any pitch. The motor shaft is thus allowed to rotate and in turn rotate the screw 5. As the air cylinder 11 starts from a fixed position and since the valve spool is in its off position, this coupling is necessary in order to allow the screw to move axially, thereby moving the valve spool which turns on the air to allow the cylinder to function. The spline coupling is a means of allowing both rotary motion as well as axial motion. The axial motion is essential in order to move the connected valve spool which, in practice can be from about a quarter inch to a half inch.

A low lead screw 5 is selected where the encoder or other means of determining motor position has low resolution. In the case of a motor having a quadriture encoder count of 500 lines of resolution, there are 2000 counts per revolution. Thus the board resolution for a screw with a one inch lead is $1/2000$ inches or 0.0005 inches.

A screw nut is affixed onto the end of the screw and is a means of moving the screw, using the air cylinder in conjunction with the motor. At a given position, with the cylinder not moving, movement is initiated by the motor. The shaft rotates, and since the air cylinder is stopped, the spline coupling allows the screw to turn in the nut, thereby causing the axial movement of the screw without the nut turning. The screw is rigidly connected to the shaft of the valve spool. It is thus seen that the movement of the screw actuates the spool which allows air to flow to cylinder. The direction of the air cylinder valve is to cause the valve spool to seek the "off" position.

The rotary linear coupling, 7, is shown adjacent to the air valve 8. The movement of the screw results, due to the coupling which translates rotary movement to linear movement, in the spool 12 of the valve to move axially. Otherwise the spool would turn and rotate which would quickly wear it out. Air valve 8 accepts a source of pressurized air and switches between one output or the other and is off (no air flow) in between. It consists of a housing with a hole through which the spool moves. FIGS. 3*a* and 4 show the valve in greater detail. It consists of housing 13 having air entrance apertures 14, 15, and 16, 17 therein. A central bore 18 allows the spool 12 to move back and forth within bore due to the rotary motion of the screw being converted to linear motion of the spool. The apertures provide a path for the air when lined up with the matching holes in the housing. When spool 12 is in the "no flow" position a small movement in either direction must be traversed before air flows. This small movement can cause positioning error equal to the "deadband". On each end of the spool, springs 19 are positioned to force the spool to the same stopping location, thereby enhancing stopping, accuracy, and repeatability. Spool 12 has a series of bushings thereon such as 20, 21, 22, 23, 24 and 25 which interact with the bore 18 to affect a seal of each area as the spool moves linearly.

A rod lock 9 comprises a cylinder which offers a means of locking the cylinder rod once in position. This is done by command from the servo amplifier board to a brake. This may be necessary if the cylinder rod 10 moves during an operation. It also provides less positional variation due to the reduction of cross sectional area from one side of the piston to the other. The air cylinder rod 10 is the active part of the cylinder 11 to which the load is attached. Its movement is a result of a differential pressure from side to side of the piston. Its accurate positioning is due to the air flow under the control of the valve always seeking the "null" position. For example, looking from the motor end of the screw 5 under the start up condition, the motor is commanded to move one revolution which is, to say one inch. Since the cylinder 11 is in the hold position, (the valve has cut off air flow, thereby locking nut 6 in place), the motion of the motor shaft is free to move both axially due to the spline coupling as well as rotationally. The rotational motion through the nut results in axial movement of the screw. This causes a movement of spool valve 12, thereby opening up the air flow to the cylinder 11. The air flow connections between the valve and the cylinder causes the cylinder rod to move in the direction to turn off the air. Thus, when the motor stops, the cylinder stops as well. The motor 3 initiates the opening of the valve spool which starts the sequence. The response of the air cylinder moves the spool to turn it off. The precise location of the spool on stopping is due to the opposing spool springs 19.

FIG. 2 shows a different configuration rod lock, such as 9 in FIG. 1, thus the active piston area from one side of the piston 26 to the others differs by a large difference than with the rod lock cylinder. The valve 8 can operate by rotating the spool 12 without undue failure. This is due to the fact that the spool is machined to a tight tolerance and lubricated by air under pressure thus eliminating the need for the coupling 7 as shown in FIG. 1. This results in a more compact package. Lines 30 and 31 are shown connecting the valve to the cylinder for movement of air. The valve configuration of FIG. 2 is in a different location that FIG. 1 with nut 6 and screw 5 on the side opposite the valve from motor 3 and spline coupling 4. Member 32 is shown connecting the screw shaft 5 and nut 6 to the cylinder shaft 10 to accommodate movement of the latter.

Figure 3:
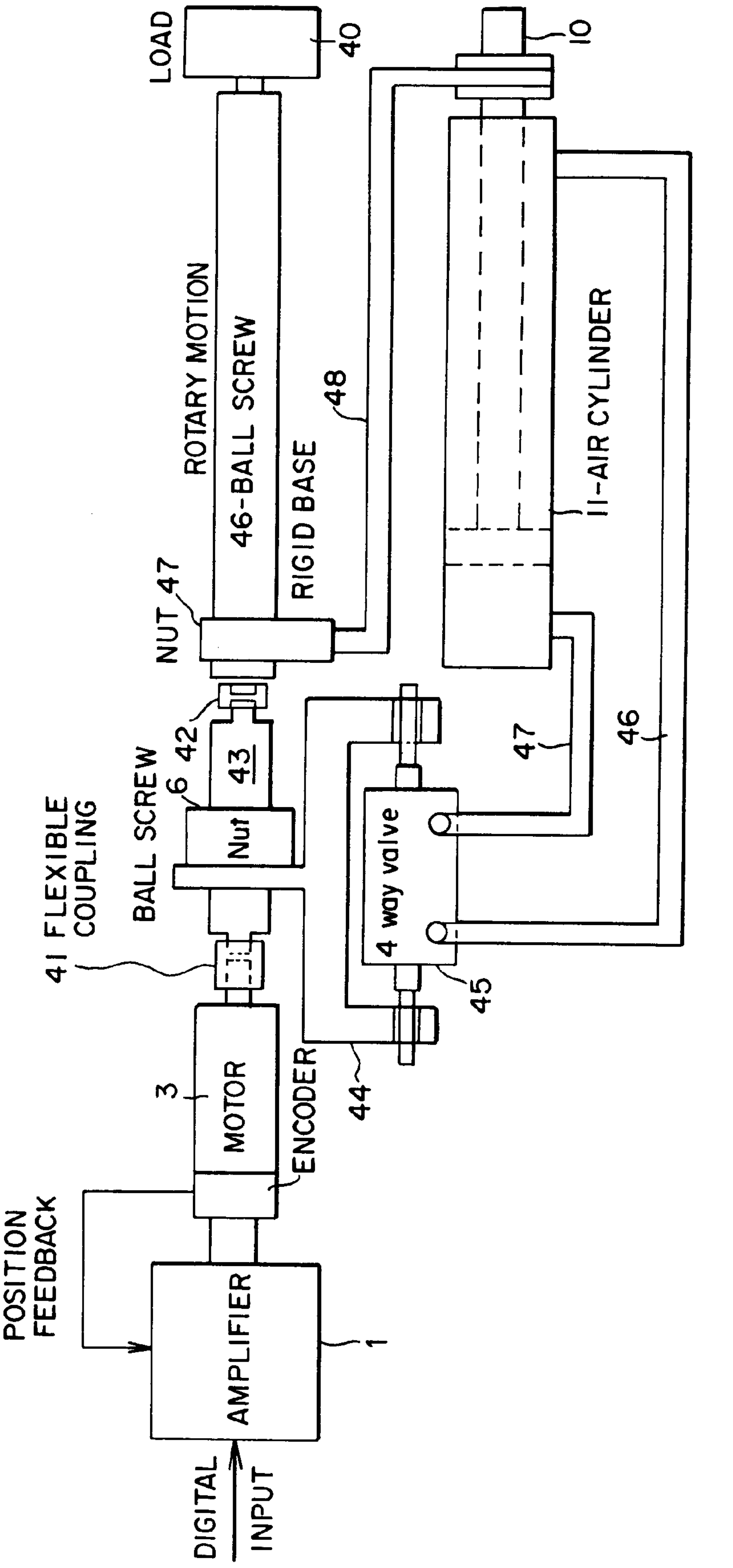
FIG. 3 is another view of the systems using a four way valve to control the System.
Figure 3A:
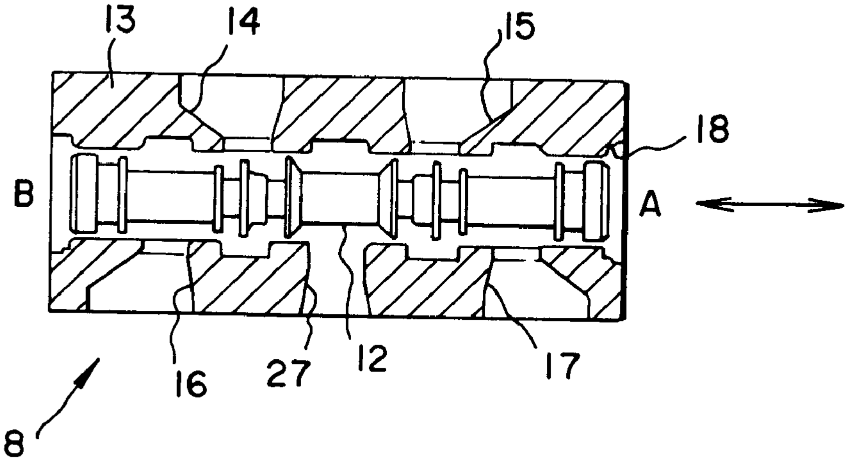
FIG. 3*a* is a cross-sectional view of the valve used to control the system.
Figure 3B:
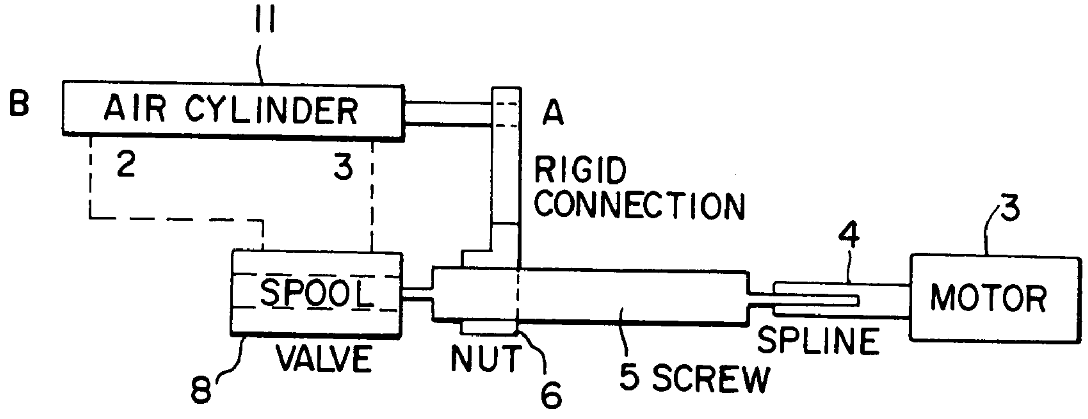
FIG. 3*b* is a diagrammatic view of the valve of FIG. 3*a*.
Figure 4:
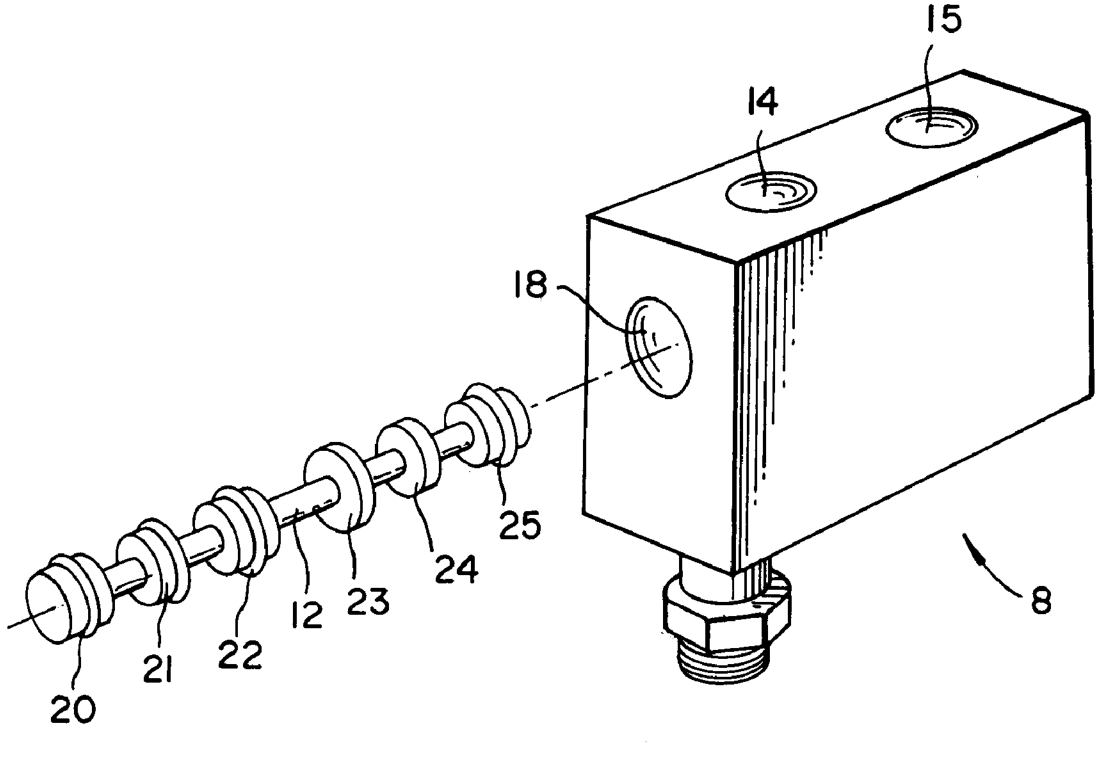
FIG. 4 is a perspective view of the valve of FIG. 3*a* with the movable member shown removed from the valve housing.

Referring to FIGS. 3*a* and 3*b*, there is shown the valve operation and its relation to the ball screw motor. The valve spool 12 moves between pistons A and B as noted in FIG. 3*a*. It generally moves about $3/16^{th}$ of an inch either way from the "off" position (spool centered). An air source is connected to 16, 17 and an exhaust to 27. The air cylinder connections are 14, 15. If the spool is moved to "B", air flows from 16 to 14 and exhausted from 15 to 27. If the cylinder is mounted parallel to the valve spool this results in moving the cylinder rod in the direction from B towards A. Moving the spool from the off position (centered) to A results in air from 17 to 15 and exhausts from 14 to 27. The cylinder rod moves in the direction from A to B.

Looking at FIG. 3*b*, assume that the cylinder rod 10 is in a fixed position and that the motor is not actuated. The rigid connection between rod 10 and screw 5, noted as 35 in FIGS. 1 and 2 will allow only rotary motion of the screw. Because of the pitch of the screw, a linear motion is required by the screw when there is a rotary motion. The screw is bounded by valve spool 12 on one side and a spline coupling 4 to the motor on the other side. Thus a linear motion is possible to the extent of the spool movement in the valve. When no linear force to the valve spool is in the off state, it is assumed that the motor starts and causes a short movement of the screw to the spool of $\frac{3}{16}^{th}$ inches and stops. This movement turns the valve on with a motion of A to B (assuming the motor rotation and screw pitch are connected in this way). This, in turn, causes the cylinder rod to move in the B to A direction. With the motor stopped, the cylinder rod will cause a linear motion of the spool 12, and thereby to screw 5 (resulting from the lack of rotation of the motor). Naturally, the spool will go to the "off" position since it moves with the cylinder rod from B to A.

The motion of air cylinder rod 10 is to follow the null position of the spool. The spool is thus displaced by the motor and moves back to the null position since its motion is in a direction to cut off the air supply. The system is characterized as a "null follower".

Figure 5:
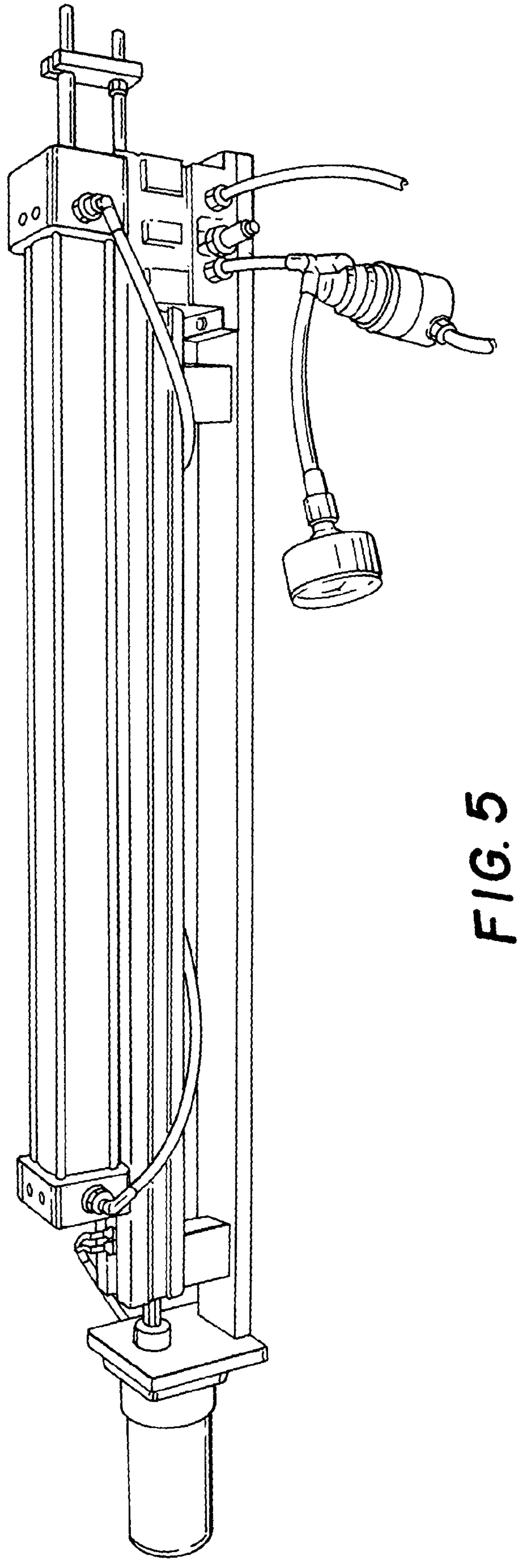
FIG. 5 is a photograph of the device which constitutes the invention in one form.

FIG. 5 shows a photograph of the invention with the motor on the extreme left hand side, the screw coupled to the motor and activating a valve shown on the extreme right hand side of the photo, and the air cylinder mounted atop the rest of the device with rod 10 extending from the right hand end thereof. The air lines are shown attached to the valve.

FIG. 3 shows the system employed as a pneumatic positioning system with a load noted as 40. The amplifier 1 controls motor 3 which, through flexible couplings 41 and 42, dirves a first ball screw 43 which has nut 6 thereon which, in turn, is connected for a frame 44 which controls the operation of a four way valve 45. The valve controls, through lines 46 and 47, the flow of air to and from the air cylinder 11. Coupling 42 connects ball screw 46 to it and mounted on ball screw 46 is nut 47 coupled to a rigid member 48 which connects with air cylinder rod 10.

Figure 6:
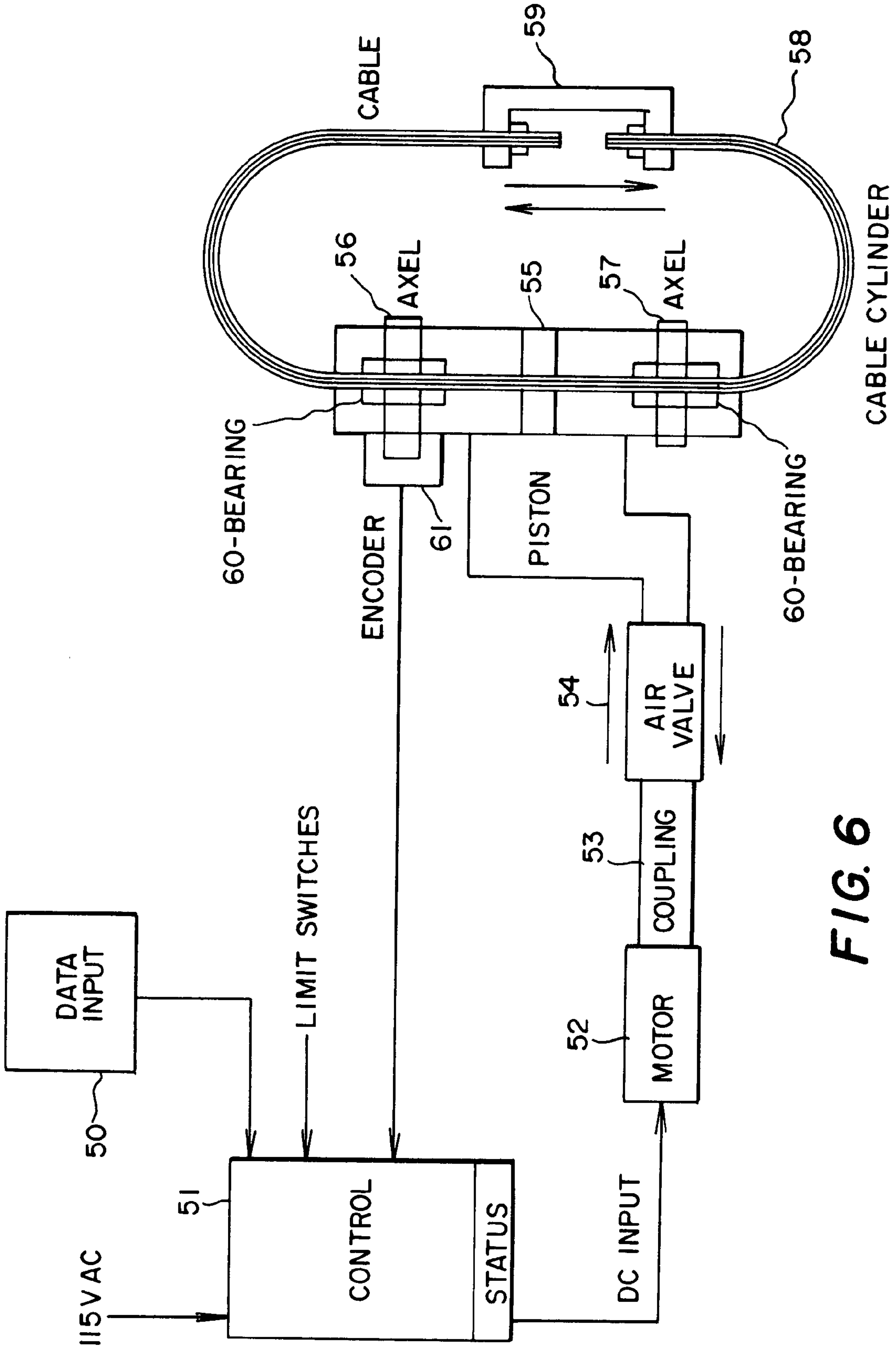
FIG. 6 is a diagrammatic view of the control for the valve of FIG. 3*a*.

FIG. 6 shows the system being employed as a cable cylinder positioning system. Data input 50, control 51, motor 52 coupled via 53 to air valve 54 which controls piston 55. . The axles 56 and 57 movement in the cylinder to bearings 60. Control 51 is coupled to encoder 51. Cable 58 connects load 59 with the system.

Figure 7:
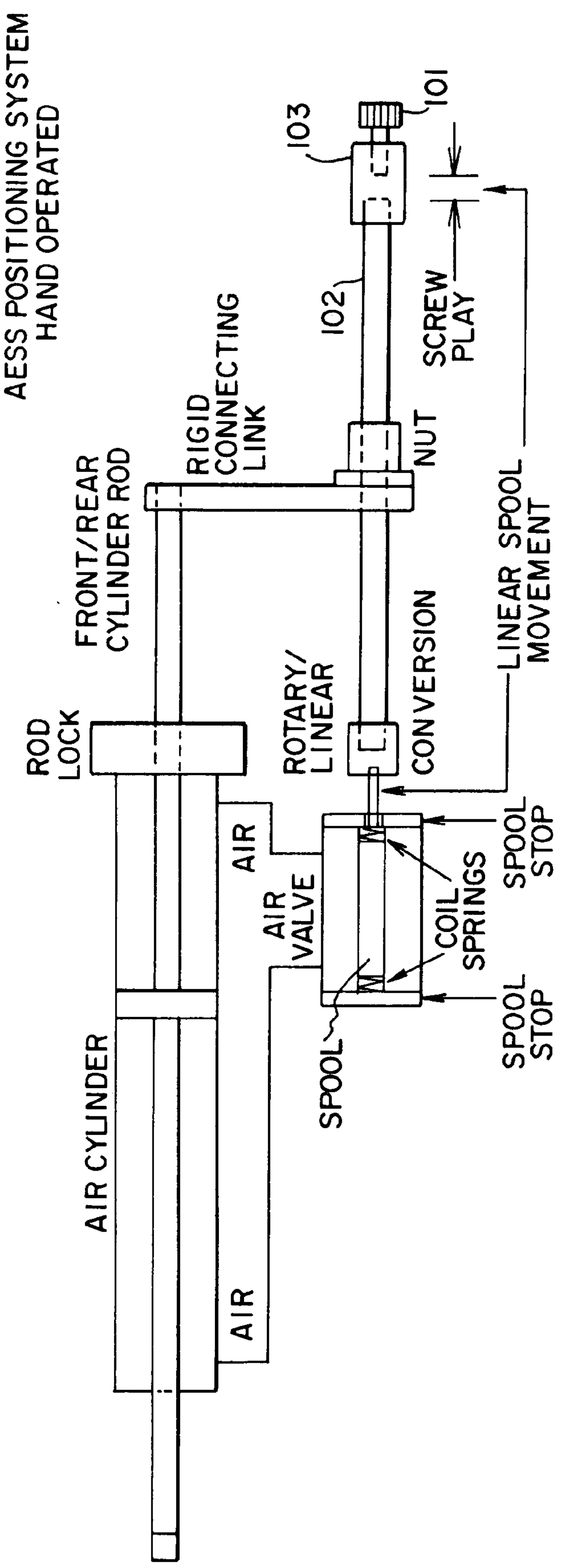
FIG. 7 shows a diagrammatic view of the system with a manual hand adjustment.

FIG. 7 shows a positioning system which is hand operated by knob 101 attached to screw 102 via spline coupling 103. The system operates the same way as the system in FIG. 1 operates, The obvious advantage of this mode of operation is to allow a relatively safe and flexible means of checking the system. Air pressure, position settings, load size and speed of operation may be carefully checked as a subsystem prior to applying power to the entire machine.

Figure 8:
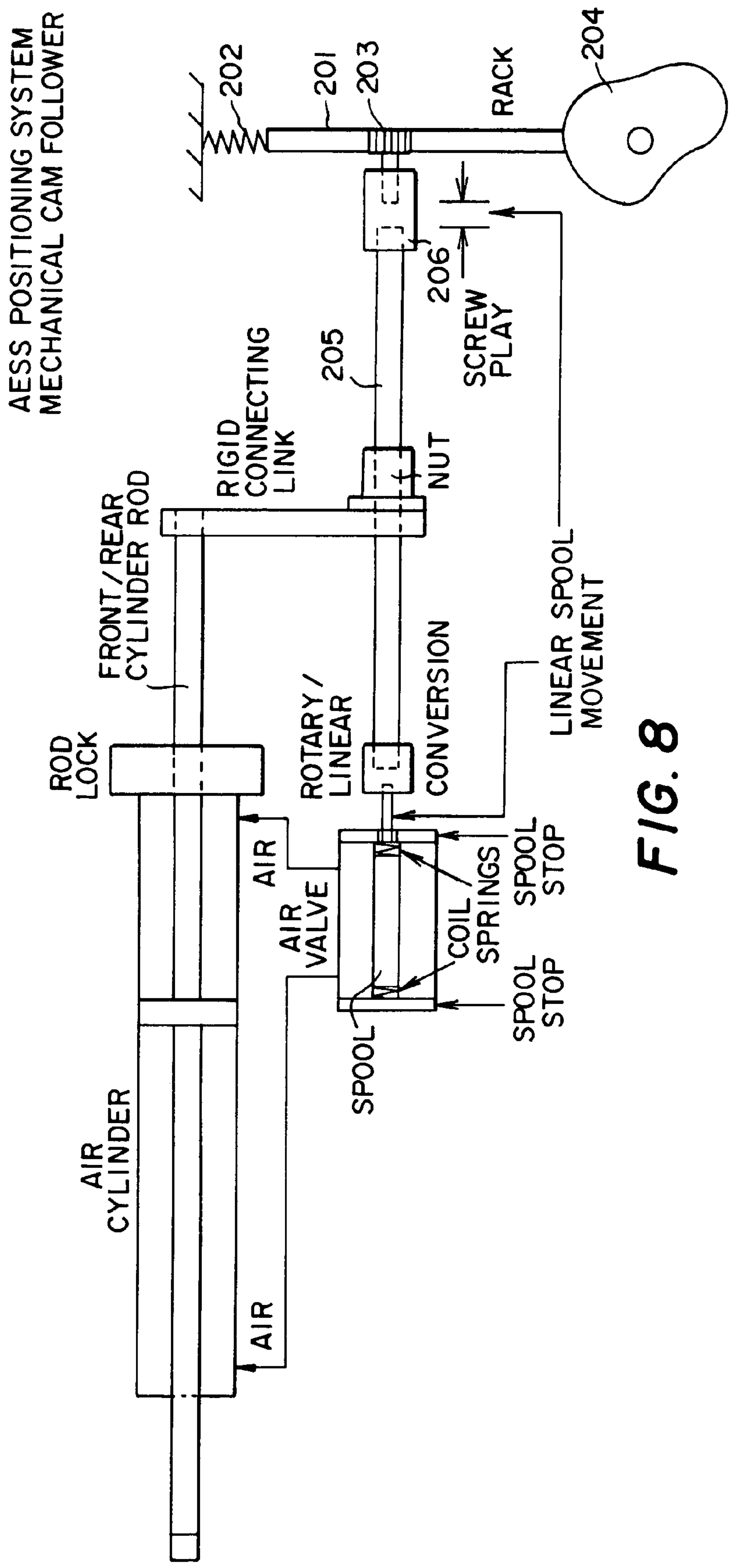
FIG. 8 shows a diagrammatic view of the system with a mechanical cam and rack and pinion controlling the position of the adjustment screw.

FIG. 8 shows a system variation which employs a rack 201 and pinion 202 operated upon by cam 204 and spring 203. The pinion shaft is joined to screw 205 via spline coupling 206 and the system operates as the system in FIG. 1. The rack is terminated by a roller or bearing of some sort to follow the cam.

Figure 9:
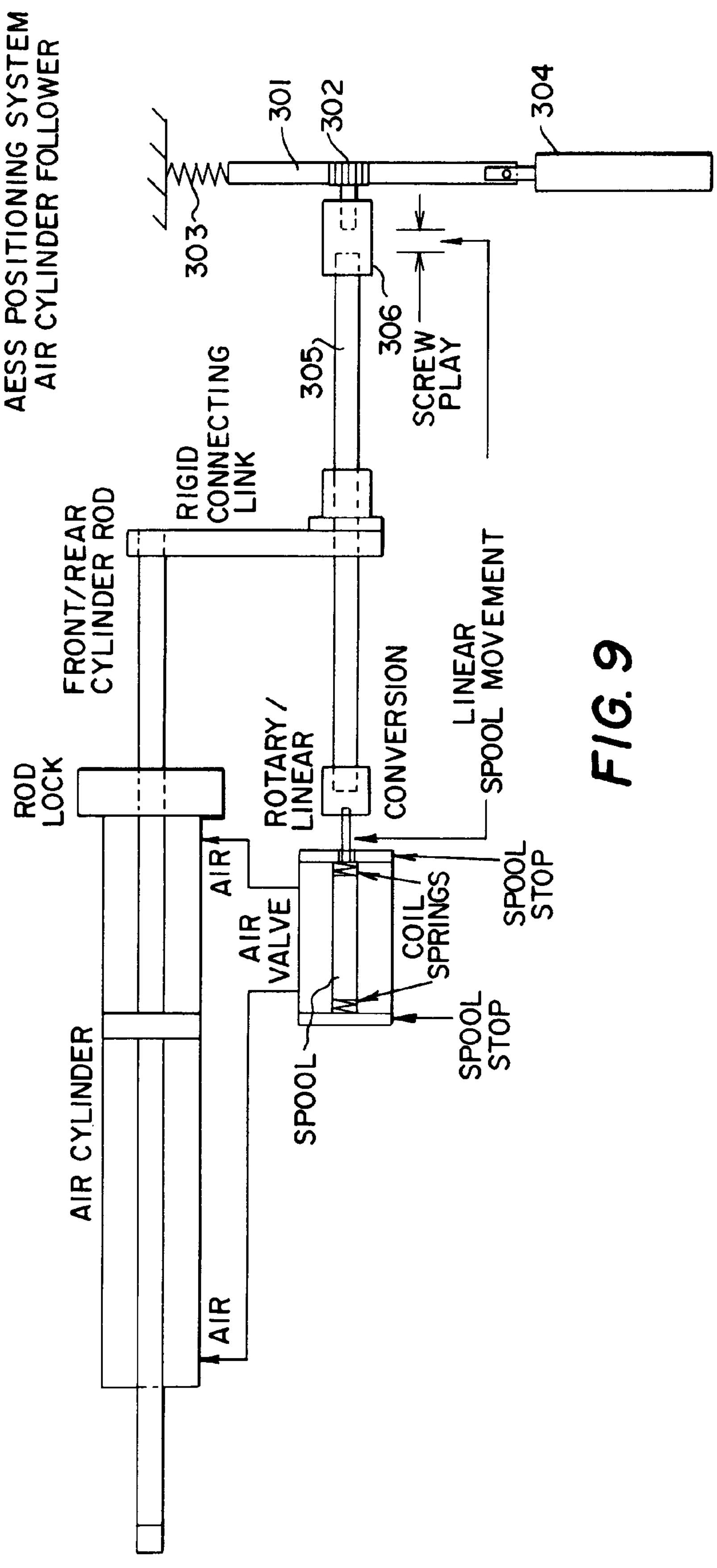
FIG. 9 shows a diagrammatic view of the system with an air cylinder controlling adjustment of the rack and pinion.

FIG. 9 shows a system as in FIG. 1 and has a rack 301 and pinion 302 which is hung from spring 303 and has a cylinder 304 acting thereupon. The pinion shaft is connected to screw 305 via spline coupling 306. This system provides additional capacity in that the existing cylinder is coupled to the rack in place of the cam and the spring. Thus additional capacity is enabled without reducing coordination.

Figure 10:
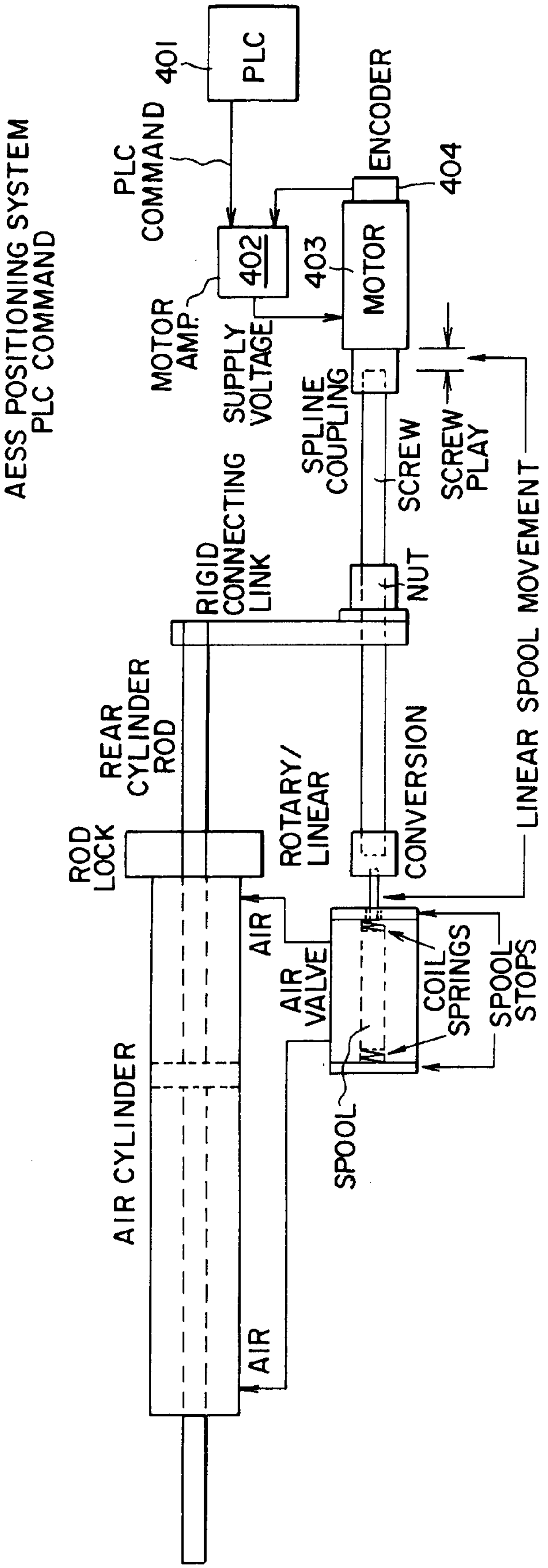
FIG. 10 shows a diagranmnatic view of the system with a PLC controlling a motor which drives the adjustment screw.

FIG. 10 has a PLC command system 401 acting directly upon the system which has a motor amplifier 402, encoder 404 and motor 403. It operates in the same fashion as the system of FIG. 1. The matching amplifier 402 and motor 403 for the servo system is adaptable for use as an output which uses PLC which has a stepper control capability. A stepper system amplifier could be used in lieu of a PLC.

Figure 11:
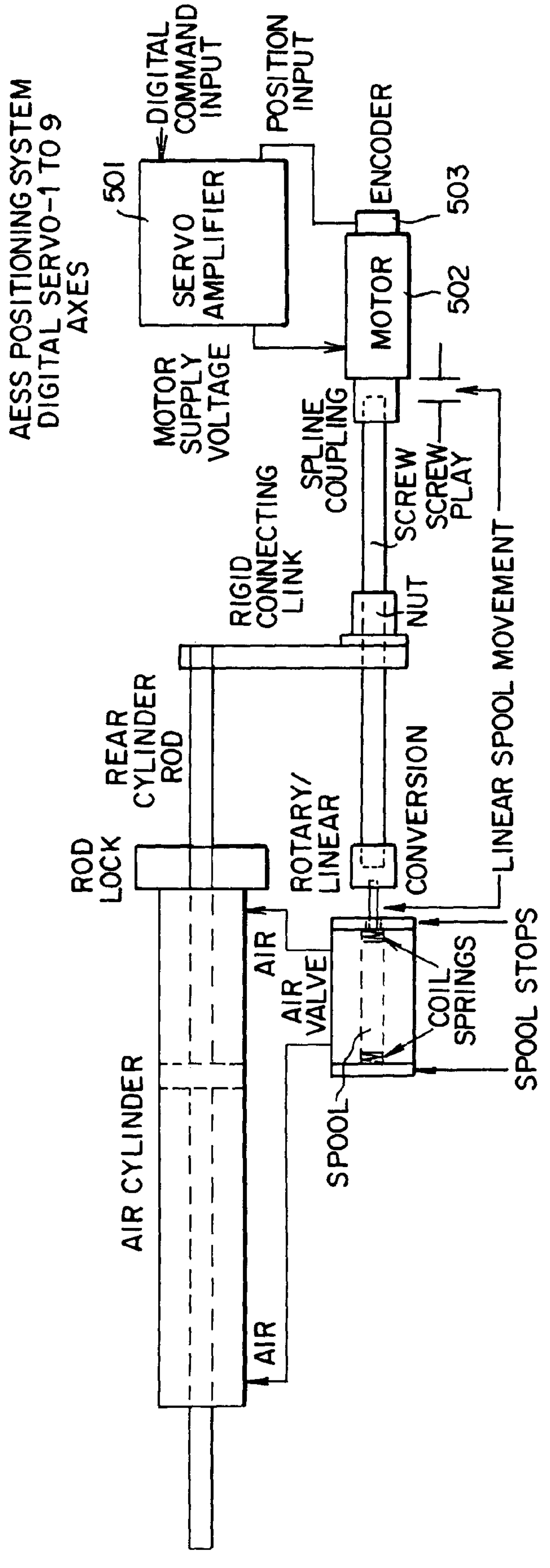
FIG. 11 shows a diagrammatic view of the system with a servo amplifier controlling the adjustment screw.

FIG. 11 shows a system that operates similarly to that of FIG. 10 which has a servo amplifier 501, motor 502 and encoder 503. This system can accommodate up to 9 axes. The system is designed for the air cylinder positioning system. The amplifier can be used for DC brush or brushless motors as well as for the air cylinders(s) in any order. The amplifier 501 is digital and uses a simple command structure similar to the Galil.

The air cylinder positioning control is operated through the operation of the device. Assuming a starting position of the air cylinder with its rod at rest, i.e., equal force on each side of the air cylinder piston (the spool of the air valve is in its null position, therefore no air path is open). The screw nut is held in position by its attachment to the cylinder rod which will not move until there is movement of the valve spool allowing air to flow to the cylinder. The manual control can be turned in either direction at any rate and stop at a new and different position. The screw may move linearly the amount permitted by the valve stop (which is one half the total permissible liner movement of the valve spool of about $\frac{3}{16}^{th}$ of an inch) and rotationally an amount dependent on the screw. The movement of the spool in the air valve opens up from the valve to the air cylinder (which is connected in a way to move the cylinder rod in a direction to cause the valve spool in the air valve to turn the air off) causing it to go to its off ("null") position. Thus the rotation of the screw is equal to the rotation of the manual control knob. This rotation causes a movement of the air cylinder rod equal to the number of revolutions times the screw pitch. The rotation of the manual control knob causes a rotation of the screw, which in turn results in a force on the nut in the direction the reverse of the screw, thereby allowing a smooth movement with little friction. Therefore, the pitch of the screw is not limited. A result of this is that the speed of the linear motion increases in proportion to pitch as well as the speed of the rotation of the control. Conversely, a reduction of pitch increases positioning accuracy and decreases the speed of the linear motion. Since the force of air from the valve aid the movement of the air cylinder rod and reduce the friction on rotating the screw, a lower power motor may be used. The valve has a built in null position spring set of two springs which force the spool to a repeatable null position when it is not actuated. This spring set also insures a repeatable starting spool position as well as position stability in the null (off) position. This is particularly important when the servo driver is commanded to decelerate at a very low rate. Thus, by selection of the proper spring force, the starting and ending positions are the same. The force required by the control loop is constant and unaffected by the load. The control loop includes the valve and the force to spool against the spring as well as to overcome friction thus eliminating the need to modify control settings as the load changes.

Air/Electric Servo System

System Description

This servo system features component flexibility in order to meet a wide range of applications at a low cost. At the same time it offers improved reliability. This is possible because of the flexibility of including air cylinder(s) with precise position control as an alternative to servomotors. An additional advantage is that the load on the air cylinder(s) does not require the compensation demanded by servomotor closed loop systems.

The control board may be configured to act as a one axis positioning system or as a mother board servicing as many as eight daughter boards. Up to nine axis coordinated motions are available. Each of the axes may be configured with a motor or an air cylinder. Any type of motor (brush or brushless) or air cylinder may be used with various types of rotary or linear position sensors.

The system may use an ASCII handheld controller, computer, step motor controller or PLC controller. A simple command structure is employed to control output position, velocity, acceleration, deceleration and wait time as well as operate digital outputs.

Overview

The system architecture is based on a mother board and up to 8 daughter boards. Each of the boards will include a 68332 processor. The mother board will have a complete single axis unit to drive either a brush or brushless motor which may be operated directly or in conjunction with the pneumatic system. Power will be supplied by a separate board or external supply. The mother board will accept all system commands and send them to the daughter boards as appropriate. Diagnostic, PID, and other system software will reside in the mother board. The daughter boards will be essentially a copy of the mother board with reduced software, memory, and communication capability. Each of the daughter boards will have a means of identification (rotary dipswitch) to insure that no commands are misdirected. Daughter boards are to have expandable (RAM) memory to store data needed to locate its axis each millisecond (if necessary because of traffic density).

User Features

1. Capable of driving a single dc brushless or single brush motor and accepting an encoder type feedback for positioning (180V, dc, 10 amp rms, 12 amp peak or, optionally, 360V, dc, 10 amp rms, 12 amp peak).
2 Personality definition by software.
3. One to nine axis capability.
4. Complete (and simple) software command system.
5. Simple error/failure diagnostics.
6. Commutation position to come from encoder on the motor. Also a sensorless mode available using an encoder with an INDEX.
7. Position information to come from
   a. Encoders on the motors or
   b. Hall effect pickups from a reader moving over a linear magnetic scale for motor with rotary to linear means of conversion.

Hardware

Multi-Axis Setup Capabilities:

1/1024 second position update rare motherboard can store 17 minutes of compressed data for a 6 axes system in Flash memory (could be increased with lower update rates)

motherboard plus 8 daughterboards=9 axis capability also supports line command for up to 9 axes (with trapezoid profile) i.e., PR300, 800, 1000;BG; would command 300 count position move for axis #0, 800 count for axis #1, 1000 count for axis #2.

Multi-Axis Setup Possibilities:

connect motherboard RS-232 to computer serial port connect daughterboards together using twisted pair wire in a multi-drop configuration (RS-485)

select rotary DIP switch on each daughterboard to indicate axis number (motherboard is #0)

connect power to all boards send either line commands or download continuous position commands to motherboard in RS-232.

Encoder Feedback:

may use TTL single ended (short lengths under 20 inches) or differential (such as Agilent HEDL series)

maximum count rate is 180,000 counts/second

Command Inputs:

RS-232 link to host computer

STEP and DIRECTION (stepper input 45 kHz)

Other Inputs:

2 limit inputs 1 home input 2 general purpose inputs an external I/O board may be added for expansion Rotary Dipswitch:

sets RS-232 speed on motherboard: 1200, 9600, 19200, 38400, or 57600 bits per second sets axis number on daughterboard Outputs (Isolated):

Currently outputs are defined as DIRECTION, and ROD LOCK (stop motion). Two more are available and can be user defined e.g., time of accel/decal, limit on, glue on/off, etc Status Indicators:

CPU ok

Vel limit

I peak limit

I rms limit input active error

Motor Output:

brush brushless

Hall commutation

Sensorless commutation (uses encoder with INDEX)

Max. RPM depends on encoder:

5400 RPM with 500 line encoder 13,500 RPM with 200 line encoder

Power Supplies Required:

5V logic

12–180 VDC power (moderately filtered)

Command Set

ASCII Command Entry:

Format: <2 character command><optional negative sign ‘-’><optional value><;>

The backspace key can be used to make corrections. Commands are case sensitive.

The controller board returns the following ASCII characters for the given condition:

":" Command accepted

"?" It Command not accepted

"A" two or more daugliterboards have the same address

"B" RS-232 receive buffer full

"C" Command memory buffer full

"D" Motor driver failure (or excessive current caused by motor failure)

"E" Encoder failure (or power section failure)

"F" Movement finished

"H" Home position found (or limit switch when used with soft limit mode)

"L" Limit activated

"ME" Motor error: encoder resolution not compatible with motor (# of poles)

"MI" Motor error: index not found

"V" Checksum failed on non-volatile memory

"X" Other error—check LEDs

Limit Input Signal

Pin 9 on P2 is the "LIMIT" input pin used for movement limit switch inputs.

Low voltage input indicates normal operation.

Voltage at pin must be held low because of 4.7K pull-up resistor.

High voltage (+5V) input indicates a limit has been reached.

Upon high input, controller will stop and move instantly, output an "L" to the serial port, and light the Hm/LIM/inA/inB LED (D5).

Movements can be executed while input is high, and LED will turn off when input goes low.

Dump Settings Command:

This command displays a table showing both power-up and current motion settings. Each line consists of a two letter symbol, the power-up setting, a "|" separator, and the current setting. eg) after typing the DS command, the first line reads AC 50000|20000. This means the power-up value for acceleration is 50000 and the currently used value is 20000.

A brief summary of the table contents is shown below:

AC acceleration (counts/sec$^2$)

DC deceleration (counts/sec$^2$)

SP slew speed (counts/sec)

GP position gain (set between 1 and 9999)

GT torque gain (set between 0 and 9999)

GV velocity gain (set between 0 and 9999)

GD derivative gain (set between 0 and 9999)

GI integrator gain (set between 0 and 9999)

LP peak current limit (in tens of mA)

LR RMS current limit (in tens of mA)

LV velocity limit (counts/sec)

Dump Driver Configuration Command:

This command displays the setup for encoder and motor. Each line consists of a two letter symbol and the current setting. A brief summary of the table contents is shown below:

EF encoder fail check (0=disabled, 1=enabled)

MC brushless motor commutation type (0=Hall, 1=sensorless)

ME brushless motor Hall electrical spacing (60 or 120 degrees)

SO INDEX offset from ideal point (sensorless mode only)

PP number of brushless motor pole pairs (sensorless mode only)

MT motor type (0=brushless, 1=brush)

PM maximum PWM duty cycle (in 0.5% increments)

PF position format (determines polarity of PR/PA/TP commands)

CE configure encoder (sign=encoder orientation, magnitude=counts/rev or 4 × encoder lines)

Tune Mode:

Enter the TU command to enable tune mode. At least 128K of RAM must be installed on the board for this mode to be entered. Upon receipt of a GO or BG command, the unit will run the motor as usual but will also store 3 seconds of error, current, velocity, PWM, and limit/fault info. After the run, the user may change parameters and do another run overwriting the last run, or the user can enter the command DL to download the last run. If you use Hyperterminal, select "capture text" before typing the DL command. When the download is complete, select "stop" on the capture text submenu. After the data is downloaded, it should be converted into text form using the program CONV_MO2.EXE. This file can then be imported into a spreadsheet as a tab delimited text file and the results may be graphed and analyzed.

While only a few embodiments of the invention have been shown and described it will be obvious to those of ordinary skill in the art that many changes and modifications can be made without departing from the scope of the appended claims.

Movement Commands

MOVEMENT COMMANDS:

| Command | Value Range | Initial Value | Description |
|---|---|---|---|
| AC <value> | 10–999999 | 10000 | Acceleration rate (counts/sec$^2$) (Negative number for AC sets deceleration rate) |
| BG | — | — | Begin trapezoidal move. An "F" will be displayed when the move is finished. |
| DC <value> | 10–999999 | 10000 | Deceleration rate (counts/sec$^2$) |
| GO | — | — | Go to position as fast as possible without using a motion profile. An "F" will be displayed when the move is finished. |
| PA <value> | ±1000000000 | — | Position Absolute (counts) |
| PR <value> | ±1000000000 | — | Position Relative (counts) |
| SL | | | Soft Limit |
| SP <value> | 1 to velocity limit specified by LV command | 30000 | Slew Speed (counts/sec) |
| ST | — | — | Stop movement. Use this to immediately abort a GO, BG, or motion sequence. |

Control Commands

CONTROL COMMANDS:

| Command | Value Range | Initial Value | Description |
|---|---|---|---|
| BN | — | — | Burn parameters to non-volatile memory |
| CE <value> | ±8192 excluding zero | 1440 | Configure Encoder The sign of this indicates the orientation of the encoder, ie. generally an encoder on the back side of the motor will require a positive value and an encoder on the front will require a negative number. However, if the motor spins rapidly after being rotated slightly by hand then use the opposite sign. The magnitude of this parameter is in counts/rev (or 4 × encoder lines) and is only used to set up sensorless commuta- |

-continued

CONTROL COMMANDS:

| Command | Value Range | Initial Value | Description |
|---|---|---|---|
| | | | tion for a brushless motor. A valid resolution must be evenly divisible by the number of motor pole pairs. eg) a resolution of 1000 counts/rev is usable with a 16 pole motor (8 pole pairs) but not a 32 pole motor (16 pole pairs) - an error message will be displayed if invalid. If using sensorless commutation mode, a reset is required to take effect |
| CS | — | — | Clear Sequence currently in memory |
| DB | — | — | Dump Board configuration. |
| DD | — | — | Dump Driver configuration. Displays setup for encoder and motor. |
| DL | — | — | Download data Must be in test mode to execute. Then wait at least 3 seconds after last BG; or GO; before executing. Takes 20 seconds @57600 bps or 2 minutes @9600 bps to download data. |
| DS | — | — | Dump motion Settings. Table displays both power-up and current settings. Use Burn parameters command BN to transfer current settings to power-up settings. |
| EF <value> | 0–1 | 1 | Encoder Failure check (0 = disabled, 1 = enabled). |
| GD <value> | 0–9999 | 800 | Derivative Gain |
| GI <value> | 0–9999 | 200 | Integrator Gain |
| GP <value> | 1–9999 | 340 | Position Gain |
| GS <value> | 1–16 | — | Get Sequence from flash memory. Up to 16 sequences can be stored Command only available on boards equipped with flash. |
| GT <value> | 0–9999 | 50 | Torque Gain |
| GV <value> | 0–9999 | 312 | Velocity Gain |
| LP <value> | 1–3500 | 2000 | Peak current Limit (in tens of mA eg. 3000 = 30A) |
| LR <value> | 1–2500 | 1000 | RMS current Limit (in tens of mA eg. 1500 = 15A) |
| LS | — | — | List Sequence currently in memory |
| LV <value> | 1–170000 | 83333 | Velocity Limit (counts/second) |
| MC <value> | 0–1 | 0 | Set brushless Motor Commutation type (0 = Hall, 1 = sensorless). On power-up with sensorless commutation, the board will command the motor to rotate slowly until an INDEX signal is found on the encoder. This sets up the alignment of the motor. If an INDEX is not found within four seconds, an error message is displayed. Requires reset to take effect. |
| ME <value> | 60 or 120 | 60 | Set brushless Motor Hall Electrical spacing (60 or 120 degrees). Requires reset to take effect. |
| MT <value> | 0–1 | 1 | Set Motor Type. (0 = brushless, 1 = brush). Only valid on boards that support both motor types. Requires reset to take effect. |
| PF <value> | 0–1 | 0 | Set Position Format. Changing this parameter changes the polarity of the PA/PR commands and the LIMIT functions. |
| PM <value> | 1–200 | 196 | Set Maximum PWM duty cycle (in 0.5% increments). |
| PP <value> | 1–16 | 4 | Set number of brushless motor Pole Pairs (eg. a value of 4 indicates an 8 pole motor). This represents the number of electrical rotations per physical rotation. Value is only used to set up sensorless commutation. Requires reset to take effect. |
| QV | — | — | Query software Version. The software version is also displayed at power up. |
| RP <value> | 1–65535 | — | Repeat sequence of commands the number of times specified in <value>. If no <value> specified then execute the sequence once. An “F” will be displayed when the entire sequence is finished. |
| RS | — | — | Reset the controller |
| SO <value> | ±99 | 0 | Set INDEX Offset from ideal point. If INDEX was properly aligned then this parameter should be zero. Set this only if fine adjustment is required. This value can be obtained by running BSC_INIT and is only used for sensorless commutation. |
| SS <value> | 1–16 | — | Store Sequence in flash memory. Up to 16 sequences can be stored. Command only available on boards equipped with flash. |
| TP | — | — | Tell Position. Displays the current position. |
| TU | — | — | Go to Tune/test mode. This will only work if there is sufficient RAM on board (128 K). |
| WT <value> | 1–36000 | — | Wait for Timer (in tenths of seconds). |

What is claimed is as follows:

1. A multi-axis positioning system which can be adjusted by manual following or automatic control systems and where air is used to produce a positive positioning lock on the components of said system, said system comprising at least one air cylinder means having a piston and cylinder rod or cable therein, air valve means to supply air to either side of said piston, controls means to drive said cylinder rod and said air valve means so as to provide positive air pressure on each side of said cylinder at a predetermined position so as to produce a positive lock in said position, whereby said system is able to make quick, positive moves without danger of override or movement off the predetermined position.

2. A system as in claim 1 wherein said control means includes a screw and nut arrangement whereby said control means is able to simultaneously move said rod and control air pressure on either side of the cylinder.

3. A system as in claim 2 and including a rigid connecting link between said cylinder rod and the screw and nut arrangement whereby movement of said screw both adjusts the air pressure on either side of the piston but also moves said rod in or out of said cylinder.

4. A system as in claim 2 wherein said control means includes an electric motor for driving said screw and is connected thereto by a spline coupling.

5. A system as in claim 2 wherein said air valve means includes a spool and spring mechanism for providing positive valve positioning for air to flow to either side of said cylinder.

6. A system as in claim 5 wherein said spool in located inside of a block which has two ingress and two egress ports for air flowing therethrough and said spool is positioned within a bore in which it slides for aligning the ingress and egress ports so as to provide or exit air pressure to the cylinder.

7. A system as in claim 5 wherein said screw and nut arrangement is adjustable by hand so as to adjust the position of the system accurately to position the rod in a highly accurate manner.

8. A system as in claim 5 wherein the screw and nut arrangement is adjustable by a cam and pinion arrangement so as to accurately position the rod in a highly accurate manner.

9. A system as in claim 5 wherein said screw and nut arrangement is adjustable by an air cylinder and pinion arrangement.

10. A system as in claim 5 wherein said screw and nut arrangement is adjustable by a PLC and motor amplifier.

11. A system as in claim 5 wherein said screw and nut arrangement is adjustable by a servo amplifier with digital commands.

12. A system as in claim 11 wherein said cylinder rod extends out of the rear of said cylinder and said connecting link is attached thereto.

13. A system as in claim 11 wherein said cylinder rod extends out of the front of said cylinder and said connecting link is attached thereto.

14. A system as in claim 13 and including a servo amplifier for controlling said electric motor.

* * * * *